United States Patent Office 3,298,644
Patented Jan. 17, 1967

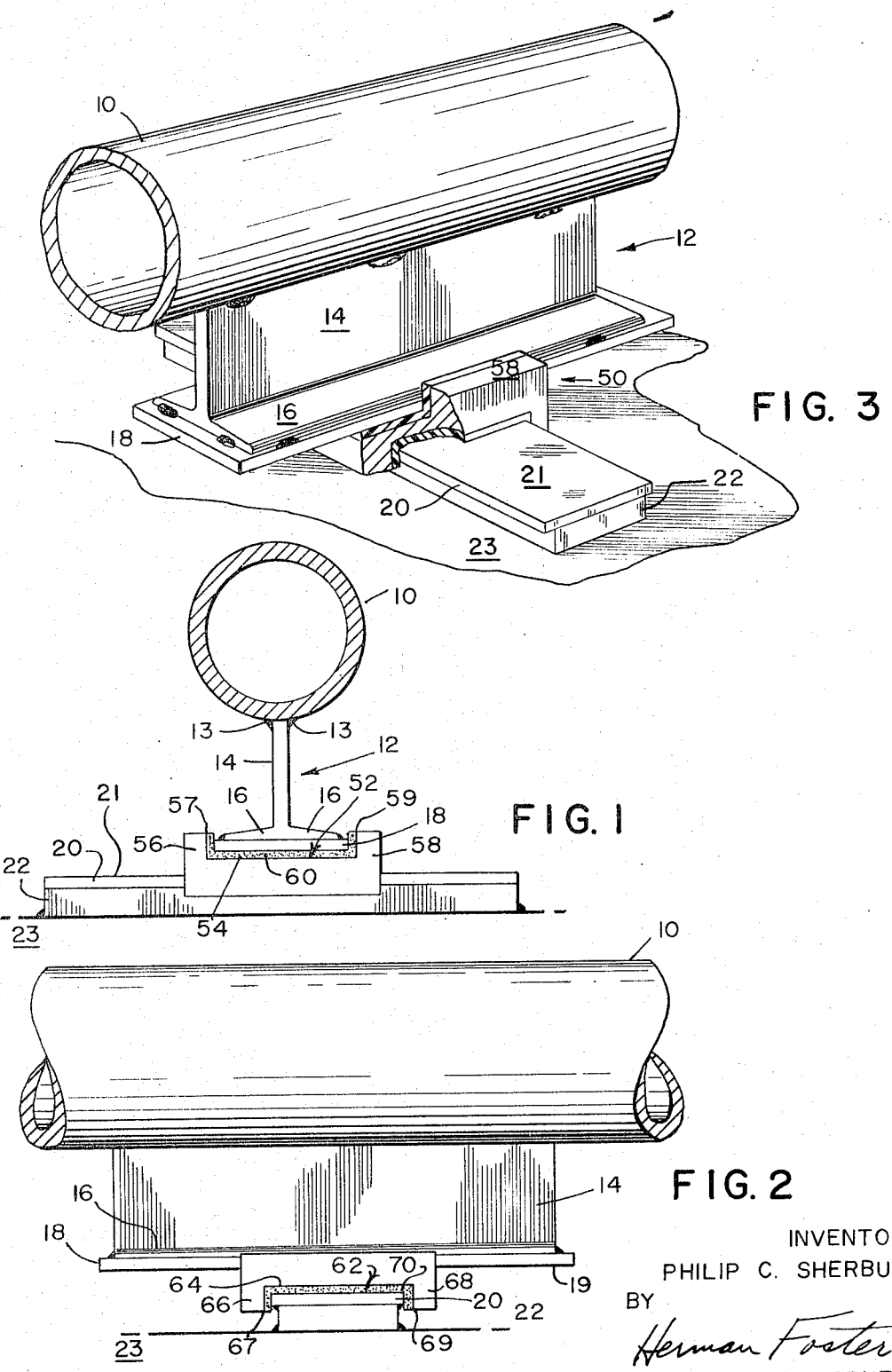

3,298,644
MOVABLE BEARING SUPPORT
Philip C. Sherburne, East Providence, R.I., assignor to Grinnell Corporation, Providence, R.I., a corporation of Delaware
Filed Apr. 20, 1966, Ser. No. 543,863
6 Claims. (Cl. 248—55)

This invention relates to slidable supports for long structural members such as beams or pipes subject to movement.

In structures such as bridges, power plants or chemical plants containing large piping installations, some of the components are frequently subjected to forces that require movement of the components in order to prevent an excessive stress build-up. These forces can result from a change in temperature or the movement of an element to which the component in question is related.

To facilitate the movement referred to above, it has become customary to utilize devices which seek to decrease the friction between the component and its support. An example of such friction reducing devices are rollers. These, however, are not universally acceptable. Therefore, for some applications it has been found that a friction reducing plate, often referred to as a bearing plate, is more desirable. It is in connection with a bearing plate construction with which my invention is particularly concerned.

A survey of the prior art pertaining to bearing plate constructions indicates that the use of bearing plates has progressed from plates bearing directly on one another in sliding contact, to plates bearing on one another with a lubricant such as oil or grease between them, and to a present state in which at least one of the plates in contact with the other has a friction reducing pad, such as graphite, bonded to its contact face to reduce sliding friction.

It has also become a practice in recent years to face a bearing plate with such an anti-friction material as reinforced polytetrafluoroethylene, a material often sold under the name Teflon. It is this practice with which my invention is particularly applicable.

Because of the cold flow characteristics of polytetrafluoroethylene, hereafter referred to as TFE, it has been found that a loaded bearing plate supported for a prolonged period by a TFE pad on a supporting base will cause the pad to become indented if an edge of the bearing plate is in contact with the pad. Should movement then be required of the plate and the structural component to which it is joined, in a direction toward the exposed portion of the pad, a much larger starting force will be required to overcome the uphill friction between the plate and pad than if no indentation had occurred. This can result in an undesirable stress increase in the structural component. Some of the prior devices have attempted to overcome this problem by making the bearing plate and pad the same size and/or by utilizing a TFE pad on both contacting surfaces of the bearing plate on the structural component and the base plate of the support. However, once movement or displacement has occurred, to bring an edge of either bearing or support plate in contact with the contact face of an opposite bearing pad, and this new position is maintained for an extended period of time, the cold flow indentation will occur, thus increasing the starting friction between the slidable contact faces.

An object of the present invention is to provide a support for a structural component, such as a pipe, which is freely slidable both longitudinally and transversely of said component.

Another object of the present invention is to provide a slidable bearing support, for a structural component such as a pipe, which is faced with TFE but which is not subjected to retarding indentations in the TFE.

Other objects and advantages of the invention will become apparent from the following description and accompanying drawing which describe and show for illustrative purposes only, a preferred embodiment of the invention.

In the drawing:

FIG. 1 is an end elevation view of a construction component, represented by a pipe, resting on my novel bearing support construction.

FIG. 2 is a side elevation view of the construction shown in FIG. 1.

FIG. 3 is an enlarged perspective of the construction of FIGS. 1 and 2 with portions cut away to clarify details.

Referring to the drawing in greater particularity, 10 indicates a steel pipe which, for purposes of example, may be considered a steam carrying part of a power plant. Fastened to the bottom exterior of the pipe is a steel member 12, often referred to in the art as a stool. This stool 12 is T-shaped in cross-section and is composed of a vertical web 14 joined at its upper edge by welds 13 to pipe 10 and terminating at its bottom edge in an integral flange member 16 at right angles to the web. The bottom face of flange 16 is joined to a flat plate member 18, also of steel and referred to as a bearing plate. The bottom face 19 of the bearing plate 18 is usually a polished flat face to reduce sliding friction.

Bearing plate 18 rests on a generally saddle shaped steel slide member 50 which in turn rests on a polished flat top 21 of a steel base bearing plate 20. The base bearing plate 20 is fastened as by welding to the top of a base support 22 which normally is part of, or joined to, the building structure 23.

Saddle shaped member 50 is a solid member having a slide channel 52 in its top surface and a slide channel 62 in its bottom surface oriented at right angles to the channel 52. Both channels are normally contained in spaced parallel planes. The upper slide channel contains a flat bed surface 54 and two spaced parallel walls 56 and 58 extending upwardly from and perpendicular to the surface of bed 54. The inwardly facing surface 57 of wall 56 and the inwardly facing surface 59 of wall 58 together with the flat surface of bed 54 are faced with a continuous uniform coating 60 of friction reducing material. An example of a suitable coating is a uniform sheet of TFE reinforced with an abrasion resistant material and sold under the name Rulon. This sheet 60 is preferably permanently bonded to the surfaces.

The lower slide channel 62 contains a flat bed surface 64 and two spaced parallel walls 66 and 68 extending downwardly from and perpendicular to the surface of bed 64. The inwardly facing surface 67 of wall 66 and the inwardly facing surface 69 of wall 68 together with the flat surface of bed 64 are faced with continuous uniform coating 70 which is of the same material as that of coating 60.

The size of saddle 50 will be determined primarily by four factors: the width of bearing plate 18, the width of base bearing plate 20, the load to be supported and the load bearing capacity of the TFE coating which is considerably less than the bearing capacity of steel. The reinforced material, Rulon, earlier referred to, can, under normal conditions contemplated here, withstand 500 p.s.i. pressure. Therefore, if we assume here a load of 18,000 lbs. to be transmitted from pipe 10 to base support 22, and the width of bearing plate 18 as 6 inches then the length required of surface 54 as measured longitudinally with the pipe 10 is derived as follows:

$$\frac{\text{Total load}}{\text{Allowable pressure}} = \text{area required} = \text{length} \times \text{width}$$

$$\frac{18,000 \text{ lbs.}}{500 \text{ lbs./in.}^2} = 36 \text{ in.}^2 = \text{length} \times 6 \text{ in.}$$

$$\text{Length} = \frac{36 \text{ in.}^2}{6 \text{ in.}} = 6 \text{ in.}$$

If we assume that base bearing plate 22 is 4 inches wide then the length required of saddle 50 as measured transversely of pipe 10 is derived as follows:

$$\frac{18,000 \text{ lbs.}}{500 \text{ lbs./in.}^2} = 36 \text{ in.}^2 = 4 \text{ in.} \times \text{width}$$

$$\text{Width} = \frac{36 \text{ in.}^2}{4 \text{ in.}} = 9 \text{ in.}$$

Thus, in this case, the minimum size of the saddle should be 6 inches by 9 inches. Naturally the desired thickness of walls 56, 58, 66 and 68 will enter into the determination of the final size of the saddle shaped member.

In some cases where the base bearing plate 20 is as wide or wider than the required computed requirement transverse to the base bearing plate axis all that need be done to derive the overall length of the saddle shaped member 50 measured longitudinally with the pipe is to add sufficient provision for walls 66 and 68. This can be determined by well known shear and moment resisting computations and need not be analyzed here.

It is contemplated that the saddle member 50 will normally be supported by base member 22 at the approximate center of the longitudinal extent of stool 12. The total length of stool 12 is determined by the expected longitudinal travel of the adjoining portion of pipe 10 plus a reasonable added factor of safety. Thus, if it is expected that pipe 10 will move 5 inches in either longitudinal direction due to expansion and contraction and 10% is added as a factor of safety, the total length of stool 12 will be 5 inches plus ½ inch plus 6 inches for the saddle plus 5 inches plus ½ inch, or a total of 17 inches.

It is also contemplated that the pipe 10 is normally to be supported by the base 22 at its approximate center. In such a case, the total length of the base 22 will be determined by the expected transverse movement of the pipe 10 and the saddle member 50, either to the left or right, plus a 10% factor of safety. Thus, if it is expected that the transverse movement of the pipe 10 and saddle 50 will be 5 inches to the left and 5 inches to the right then the total length of base support 22 will be 5 inches plus 9 inches for the saddle plus 5 inches plus ½ inch, or a total of 20 inches.

It is to be understood that the present construction contemplates that the outer edge of either end of bottom face 19 will never come in contact with the uniform TFE coating 60. Likewise, it is contemplated that the outer edge of either end of the face 21 will never come in contact with the uniform TFE coating 70.

It is preferred that the coating 60 and 70 be as thin as is practical. Since the saddle member 50 is normally expected to be made of unground hot rolled steel it has been found that sheets of Rulon in the order of a thickness of .010 inch will, when bonded to surfaces 54, 57 and 59, be thick enough to overcome inequalities in these steel surfaces and thin enough to normally withstand excessive cold flow due to the pressure imposed by bearing plate 18. A similar thickness of .010 inch, when bonded to surfaces 64, 67 and 69 will be thick enough to overcome inequalities in these steel surfaces and thin enough to withstand excessive cold flow due to pressure imposed between saddle member 50 and the base bearing plate 20.

It is thus seen that the present construction will facilitate movement of the pipe 10 in any horizontal direction with ease and without the prospect of requiring large initial forces to be overcome due to any embedment into the plastic facing used in this construction.

What I claim and desire to secure by Letters Patent is:
1. A support construction for a portion of a structural member subject to movement due to force imposed on said portion, said support construction comprising:
 (a) an elongated member bearing plate joined to and beneath said structural member parallel to said structural member,
  (I) having two ends and a smooth bearing surface facing away from said structural member,
 (b) an elongated base bearing plate adapted to be joined to a support structure, said base bearing plate,
  (I) being oriented at right angles to said member bearing plate,
  (II) having two ends and a smooth bearing surface facing toward said structural member,
 (c) a substantially saddle shaped member,
  (I) including an upper slide channel slidingly containing said member bearing plate and,
   (A) oriented to permit longitudinal movement of said member bearing plate,
   (B) having side portions for preventing transverse movement of said member bearing plate,
   (C) having a substantially uniform sheet composed essentially of polytetrafluoroethylene bonded to said upper slide channel and side portions,
  (II) including a lower slide channel containing said base bearing plate,
   (A) oriented at right angles to said upper slide channel to permit movement of said saddle shaped member along said base bearing plate,
   (B) having side portions for preventing transverse movement of said saddle shaped member on said base bearing plate,
   (C) having a substantially uniform sheet composed essentially of polytetrafluoroethylene bonded to said lower slide channel and side portions,
 (d) said member bearing plate being of a length and location such that its two said ends are always outside said upper slide channel,
 (e) said base bearing plate being of a length and location such that its two said ends are always outside said lower slide channel.

2. A support construction as called for in claim 1 wherein said elongated member bearing plate is joined to and beneath said structural member in spaced parallel relation.

3. A support construction as called for in claim 1 wherein said upper slide channel is flat and said side portions are spaced parallel side walls joined to the sides of said channel.

4. A support construction as called for in claim 1 wherein said lower slide channel is flat and said side portions are spaced parallel side walls joined to the sides of said channel.

5. A support construction as called for in claim 1 wherein said upper and lower slide channels are flat and the side portions for each channel are spaced parallel side walls joined to the sides of each of said channels.

6. A support construction for a portion of a pipe subject to movement due to force imposed on said portion, said support construction comprising:
 (a) an elongated support stool joined in longitudinal relation to and beneath said pipe, said stool comprising:
  (I) a vertical flat web having an upper edge and a lower edge joined at its upper edge to and beneath said pipe, (II) a flat flange joined to and extending from the lower edge of said web at right angles to said web, and having a flat lower face, (III) an elongated flat bearing plate joined to said lower face and having a smooth flat lower face with two opposed ends, (b) an elongated flat base bearing plate adapted to be joined to a support structure, said base bearing plate, (I) being oriented at right angles to said stool bearing plate in a plane substantially parallel to the plate of the stool bearing plate, (II) having a smooth flat upper face with two opposed ends.

(c) a substantially saddle shaped member, (I) containing an upper slide channel having a flat smooth support bed, (A) including two spaced parallel side walls defining said channel, (B) containing said stool bearing plate between said walls so as to prevent transverse movement of said stool bearing plate, (C) being oriented parallel to said stool bearing plate to permit longitudinal movement of said stool bearing plate along said channel, (D) containing a substantially uniform sheet cover bonded to the inner surfaces of said channel bed and said side walls and composed essentially of polytetrafluoroethylene, (II) containing a lower slide channel having a flat smooth support bed, (A) including two spaced parallel side walls defining said channel, (B) containing said base bearing plate between said walls so as to prevent transverse movement of said saddle shaped member relative to said base plate, (C) being oriented parallel to said base bearing plate to permit movement of said saddle shaped member longitudinally along said base bearing plate, (D) containing a substantially uniform sheet cover bonded to the inner surfaces of said lower channel bed and side walls and composed essentially of polytetrafluoroethylene, (d) said stool bearing plate being of a length and location such that its said two ends are always outside said upper slide channel, (e) said base bearing plate being of a length and location such that its said two ends are always outside said lower slide channel.

References Cited by the Examiner

UNITED STATES PATENTS

| | | | |
|---|---|---|---|
| 1,906,209 | 4/1933 | Harding et al. | 248—55 |
| 1,911,485 | 5/1933 | Axlund | 248—55 |
| 2,151,321 | 3/1939 | Glover | 248—55 |
| 2,533,370 | 12/1950 | Haug | 248—55 |

CLAUDE A. LE ROY, *Primary Examiner.*